United States Patent
Lee et al.

(10) Patent No.: US 9,122,951 B2
(45) Date of Patent: Sep. 1, 2015

(54) TEACHABLE OBJECT CONTOUR MAPPING FOR BIOLOGY IMAGE REGION PARTITION

(75) Inventors: Shih-Jong J. Lee, Bellevue, WA (US); Seho Oh, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 488 days.

(21) Appl. No.: 12/925,874

(22) Filed: Nov. 1, 2010

(65) Prior Publication Data

US 2012/0106809 A1 May 3, 2012

(51) Int. Cl.
*G06K 9/34* (2006.01)
*G06K 9/00* (2006.01)

(52) U.S. Cl.
CPC .............. *G06K 9/342* (2013.01); *G06K 9/0014* (2013.01)

(58) Field of Classification Search
CPC ... G06T 7/0012; G06T 7/0013; G06T 7/0014; G06T 7/0015; G06T 7/0016; G06T 2207/10132; G06T 2207/10136; G06T 2207/30004; G06T 2207/30104; G06T 7/0083; G06T 2207/10016; G06T 7/0085; G06T 5/001; G06T 2207/300024; G06T 7/0081; G06K 9/00127; G06K 9/4609; G06K 9/4614; G06K 9/48; G06K 9/6256; G06F 19/321
USPC ......... 382/100, 128, 134, 155, 161, 181, 199, 382/231
See application file for complete search history.

(56) References Cited

U.S. PATENT DOCUMENTS

| | | | |
|---|---|---|---|
| 7,203,360 B2 | 4/2007 | Lee et al. | |
| 7,813,580 B2 | 10/2010 | Lee et al. | |
| 8,411,952 B2 * | 4/2013 | Chefd'Hotel et al. | 382/180 |
| 2007/0058870 A1 * | 3/2007 | Liang et al. | 382/190 |
| 2008/0317314 A1 * | 12/2008 | Schwartz et al. | 382/131 |
| 2009/0297007 A1 * | 12/2009 | Cosatto et al. | 382/131 |
| 2011/0182489 A1 * | 7/2011 | Chang et al. | 382/128 |
| 2012/0027278 A1 * | 2/2012 | Chaney et al. | 382/131 |

OTHER PUBLICATIONS

Niels Van Vliet, "Image Segmentation Applied to Cytology", Technical Report No. 0303, Laboratoire de Recherche et Développement de I'Epita,—Jun. 2003.

* cited by examiner

*Primary Examiner* — Edward Park

(57) ABSTRACT

A teachable object contour mapping method for region partition receives an object boundary and a teaching image. An object contour mapping recipe creation is performed using the object boundary and the teaching image to generate object contour mapping recipe output. An object contour mapping is applied to an application image using the object contour mapping recipe and the application image to generate object contour map output. An object region partition using the object contour map to generate object region partition output. An updateable object contour mapping method receives a contour mapping recipe and a validation image. An object contour mapping is performed using the object contour mapping recipe and the validation image to generate validation contour map output. An object region partition receives a region mask to generate validation object region partition output. A boundary correction is performed using the validation object region partition to generate corrected object boundary output. An update contour mapping is performed using the corrected object boundary, the validation image and the contour mapping recipe to generate updated contour mapping recipe output.

8 Claims, 10 Drawing Sheets

TEACHABLE OBJECT CONTOUR MAPPING FOR BIOLOGY IMAGE REGION PARTITION

GOVERNMENT INTERESTS

Statement as to Rights to Inventions Made Under Federally Sponsored Research and Development This work was supported by U.S. Government grant numbers 6R44 MH075498-03, awarded by the National Institutes of Mental Health. The U.S. Government may have certain rights in the invention.

TECHNICAL FIELD

This invention relates to the biology image recognition and the region partitioning step.

BACKGROUND OF THE INVENTION

Biology image recognition, the computer extraction of regions containing biological objects such as tissue, cellular and subcellular components, bacteria, viruses of interest in microscopy images, is a fundamental step in quantitative microscopy which has broad applications and markets in basic research, drug discovery, and disease diagnosis. Biology image recognition consists of two major steps (1) a biological region segmentation step (Lee J S J. "Learnable object segmentation", U.S. Pat. No. 7,203,360, Apr. 10, 2007) followed by (2) a region partitioning step. Biology region segmentation identifies the regions in the image where biological objects of interest occupy. Region partitioning identifies the individual objects among the segmented regions for individual object counting and measurements.

Biological objects such as live cells often exist in aggregates (colonies) rather than in isolation. Therefore it is important to separate them from the acquired images of the biological objects for characterization and measurements. Region partitioning step separates individual biology regions to enable individual biology characterization. It enables biological object counting, for comprehensive individual biological object morphological characterization and for biological object type classification, population statistics and for image cytometry. These have broad applications in basic research, cancer research, toxicology and drug discovery.

Currently, most users perform biology image recognition using standard image processing software (such as Zeiss' AxioVision, Nikon's NIS-Elements, Olympus cellSens, ImageJ, Metamorph, ImagePro, Slidebook, Imaris, Velocity etc.), custom scripts/programming, or by hand. It is difficult to apply standard image processing software functions to perform biology image recognition. As a result the majority of biology recognition is performed either manually or using a simple intensity threshold that has very limited applications. Some software supports plug-ins. Yet plug-ins developed in one lab for image recognition rarely work for the application of a second lab. The users have to modify the algorithm parameters, or even the code itself.

Biology image recognition products have been developed recently for high content screening applications. However, they are coupled to specific instrument platforms, cell types, and reagents. They are not flexible for broad applications. The current immature microscopy biology recognition tools impose cost barriers on scientists and the image based scientific discovery process. The cost in skilled labor for manual recognition and custom script development is high. A greater cost is that of experiments foregone, or data uncollected, due to problems related to image recognition.

Prior art region partition methods relying on a simple but unrealistic assumption that is the background has the lowest intensity and the objects have smooth and stable intensity distribution with the lowest values at boundary and highest values around the center of the objects. Unfortunately, this assumption does not match the reality of biological objects. Special dyes are often used to stain biological objects to match the intensity distribution assumptions. However, special staining causes toxic effect that cannot be widely used in live object experiments. Also, object aggregation creates problem of separation due to obscuration and boundary overlapping.

Special prior art algorithms were programmed to handle specialized situation yet they are not general purpose and cannot be flexibly adopted to other applications (Niels VAN VLIET, "Image Segmentation Applied to Cytology", Technical Report no 0303, Laboratoire de Recherche et Développement de l'Epita, —June 2003). There is a strong need for a general purpose new method that (1) can handle broad range of applications, not just custom algorithm for specialized applications; (2) objects that do not have smooth and stable intensity distribution; (3) objects that overlap,

OBJECTS AND ADVANTAGES

The current invention provides an object contour mapping method using soft fitting for smooth and stable intensity distribution to enable accurate region partition. The object contour mapping method is teachable so it allows easy tailoring for a broad range of applications. The current invention further uses a multi-resolution approach to encode the spatial correlations and contexts through the spatial integration into low resolution for effective and efficient fitting. The invention also includes a multiple guided partition method for efficient and effective region partition. The teaching image may not be representative of an application. The teaching can be updated by an updated teaching of the current invention. This is important for creating a contour mapping recipe that has stable performance across a broad range of application images The primary objective of the invention is to provide teachable object contour mapping method for smooth and stable intensity distribution to enhance all prior art region separation methods. The second objective of this invention is to provide a teachable region partition method for biology image recognition method for broad range of applications. The third objective of the invention is to allow the proper separation of objects even when they overlap and have different sizes. The fourth object is to provide an updateable teaching method to allows a contour mapping recipe that has stable performance across a broad range of application images.

SUMMARY OF THE INVENTION

A teachable object contour mapping method for region partition receives an object boundary and a teaching image. An object contour mapping recipe creation is performed using the object boundary and the teaching image to generate object contour mapping recipe output. An object contour mapping is applied to an application image using the object contour mapping recipe and the application image to generate object contour map output. An object region partition using the object contour map to generate object region partition output. An updateable object contour mapping method receives a contour mapping recipe and a validation image. An object contour mapping is performed using the object contour mapping recipe and the validation image to generate validation contour map output. An object region partition receives a region mask to generate validation object region partition output. A boundary correction is performed using the validation object region partition to generate corrected object boundary output. An update contour mapping is performed using the corrected object boundary, the validation image and the contour mapping recipe to generate updated contour mapping recipe output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenarios

Figure 1A:
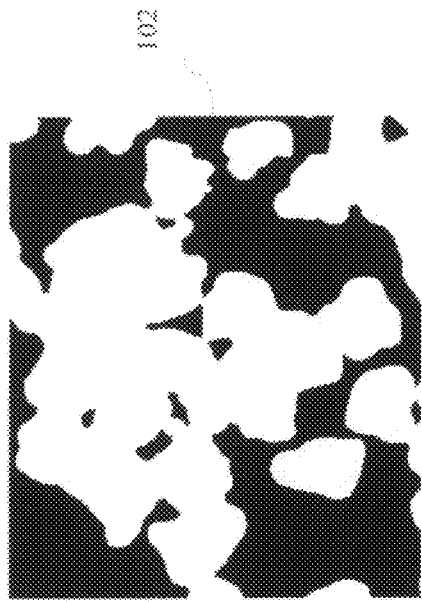
FIG. 1A shows a phase contrast biological image of cells.
Figure 1B:
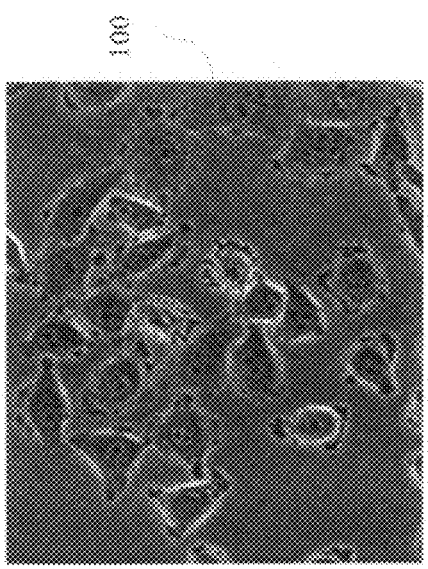
FIG. 1B shows the biological object segmentation region of FIG. 1A.
Figure 1C:
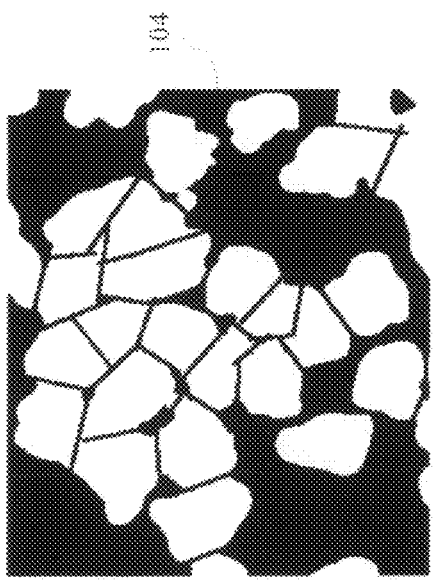
FIG. 1C shows the region partitioning result of FIG. 1B.

Biology image region segmentation identifies the regions in computer images where biological objects of interest occupy. Object partitioning in biological image recognition is the process of identifying individual objects in segmented regions. FIG. 1A shows a phase contrast biological image of cells 100 and FIG. 1B shows its biological object segmentation region 102, and 1C shows its region partitioning result 104. The current invention addresses the region partitioning process. Computer image region partition process inputs an image and the segmented objects of interest region and identifies the individual objects among the segmented regions for individual object counting and measurements. The region segmentation step could also create individual object regions from input image directly without the input of the objects of interest region mask.

Figure 2:
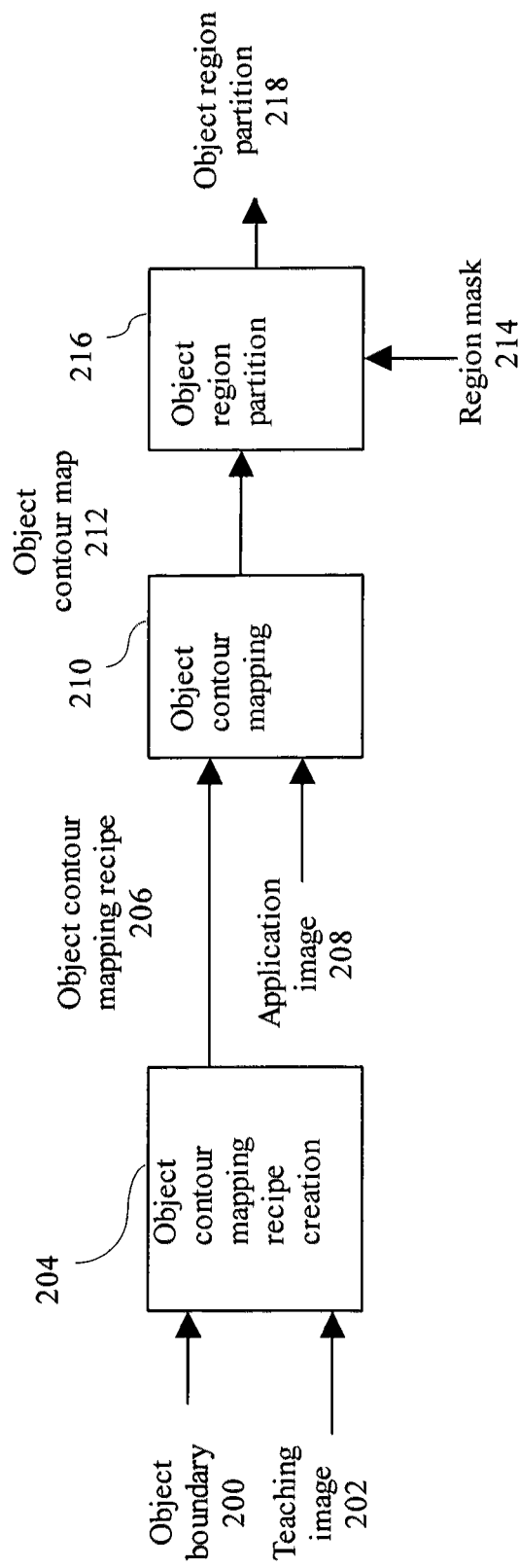
FIG. 2 shows the processing flow for the teachable region partition in one embodiment of the application scenario.

The application scenario of the teachable region partition method is shown in FIG. 2. It consists of a teaching phase and an application phase. As shown in FIG. 2, the teaching phase inputs object boundary 200 and teaching image 202. It then performs an object contour mapping recipe creation step 204. The output of the object contour mapping recipe creation step 204 is an object contour mapping recipe 206. The object contour mapping recipe 206 contains the instructions for a computer to perform object contour mapping 210 on an application image 208 during the application phase. This creates an object contour map 212. The object contour map 212 has smooth and stable intensity distribution with generally the lowest values at boundary and highest values around the center of the objects. The object contour map 212 can be processed by an object region partition step 216 to generate at least one object region partition output 218.

Figure 3:
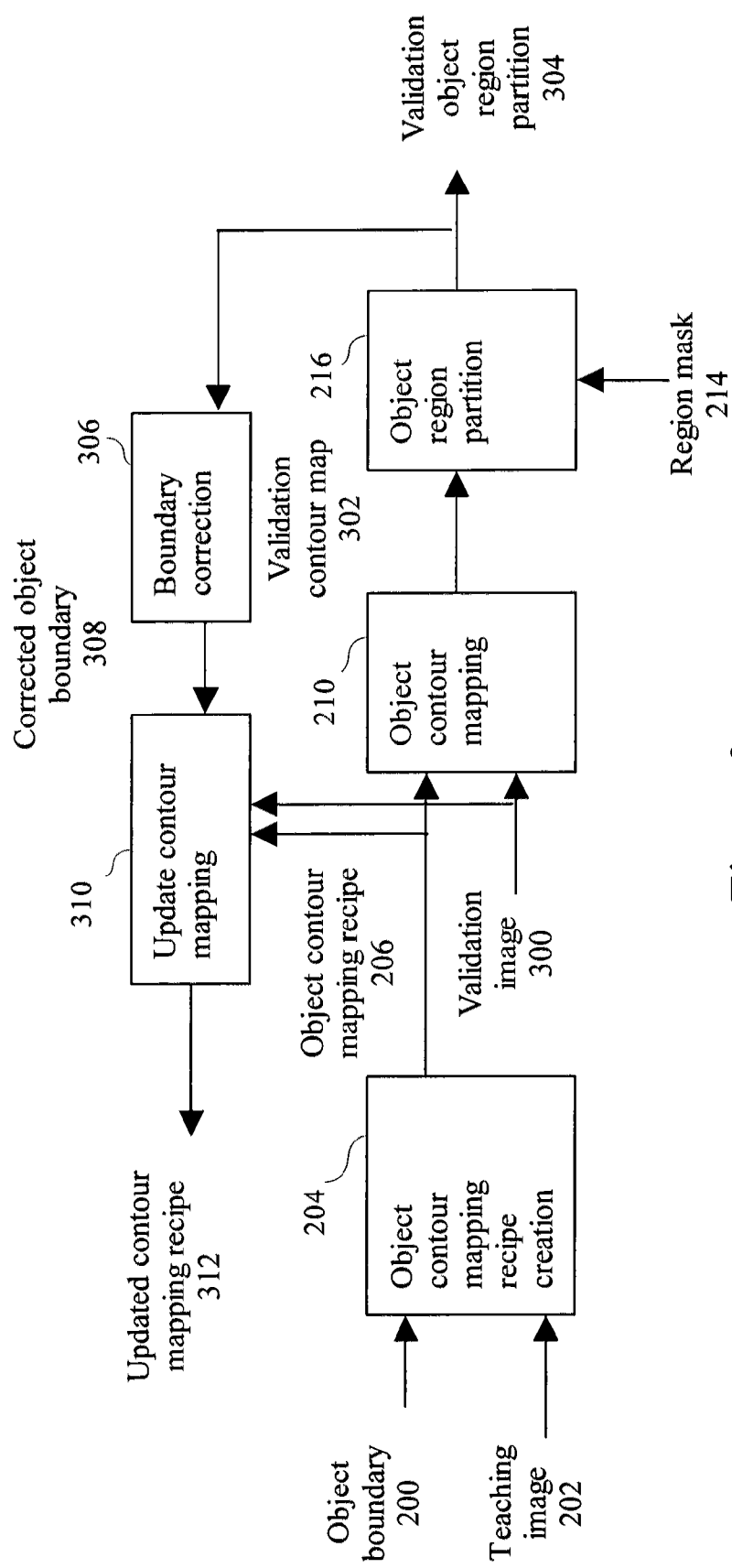
FIG. 3 shows the processing flow for the teachable region partition including an update teaching step in an alternative embodiment of the application scenario.

An alternative application scenario of the teachable region partition method includes an update teaching step as shown in FIG. 3. Under this scenario, the object contour mapping recipe creation step 204 inputs object boundary 200 and teaching image 202 for teaching. This step generates object contour mapping recipe 206. The object contour mapping recipe 206 is used to perform object contour mapping 210 on a validation image 300. The validation image 300 should be different from the teaching image 202 or contain new teaching regions of the same image. This creates a validation contour map 302. The validation contour map 302 processed by an object region partition step 216 to generate at least one validation object region partition 304. The validation object region partition 304 may contain erroneous partition boundary. This is corrected by a boundary correction step 306 to generate a corrected object boundary 308. The corrected object boundary 308, the contour mapping recipe 206 and the validation image 300 are used by an update contour mapping step 310 to generate an updated contour mapping recipe 312. The update teaching process could be applied multiple times on the same or a different validation image in an iterative fashion.

Note that the teaching phase only needs to be performed once and the taught recipe can be applied multiple times for new images during the application phase. In a preferred embodiment of the invention, the above application scenarios are implemented by a computer and the data are stored in computer memory or disks.

II. Object Contour Mapping Recipe Creation

Figure 4:
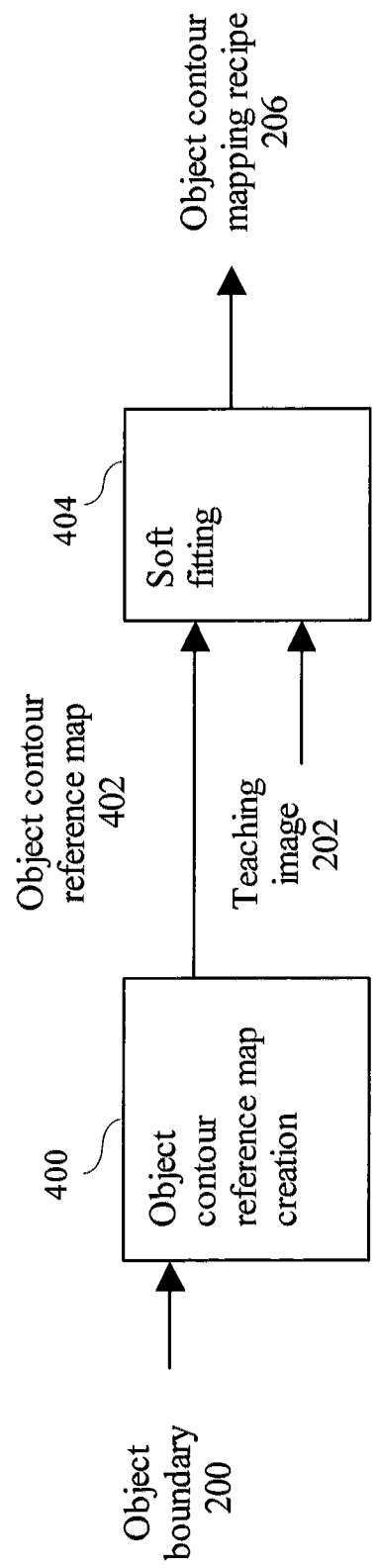
FIG. 4 shows the processing flow for the object contour mapping recipe creation method.

The object contour mapping recipe creation step is the essential process during the teaching phase. It consists of an object contour reference map creation step 400 and a soft fitting step 404 as shown in FIG. 4.

II.1 Object Boundary Input

In one embodiment of the invention, the object boundary input 200 could be created by modifying an input region mask using computer. In another embodiment of the invention, the object boundary input 200 could be created by user drawing when simultaneously viewing the teaching image 202 from a computer display.

A. Creation by Modifying the Input Region Mask

Figure 5B:
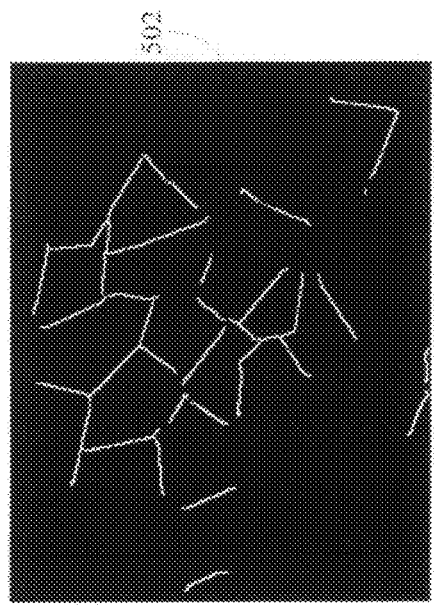
FIG. 5B shows a user cut inputs.
Figure 5A:
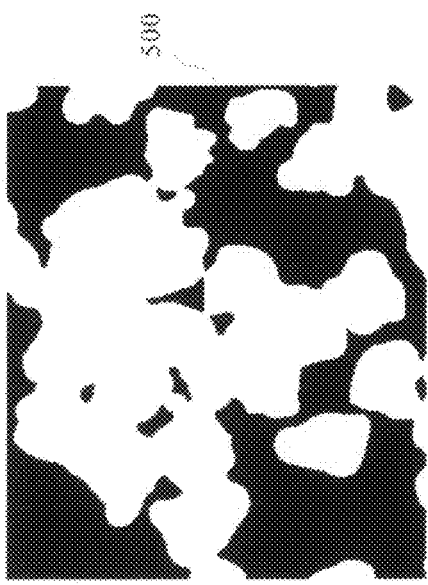
FIG. 5A shows a segmented cell region.
Figure 5C:
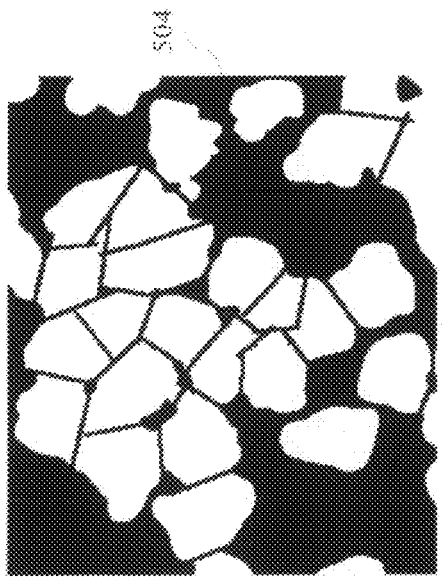
FIG. 5C shows the user cut overlaid on the segmented cell region of FIG. 5A.

FIG. 5A shows an input object region mask 500. A user draws cutting lines 502 from a computer monitor to separate individual objects as shown in FIG. 5B. This results in an object boundary 504 as shown in FIG. 5C.

Figure 6:
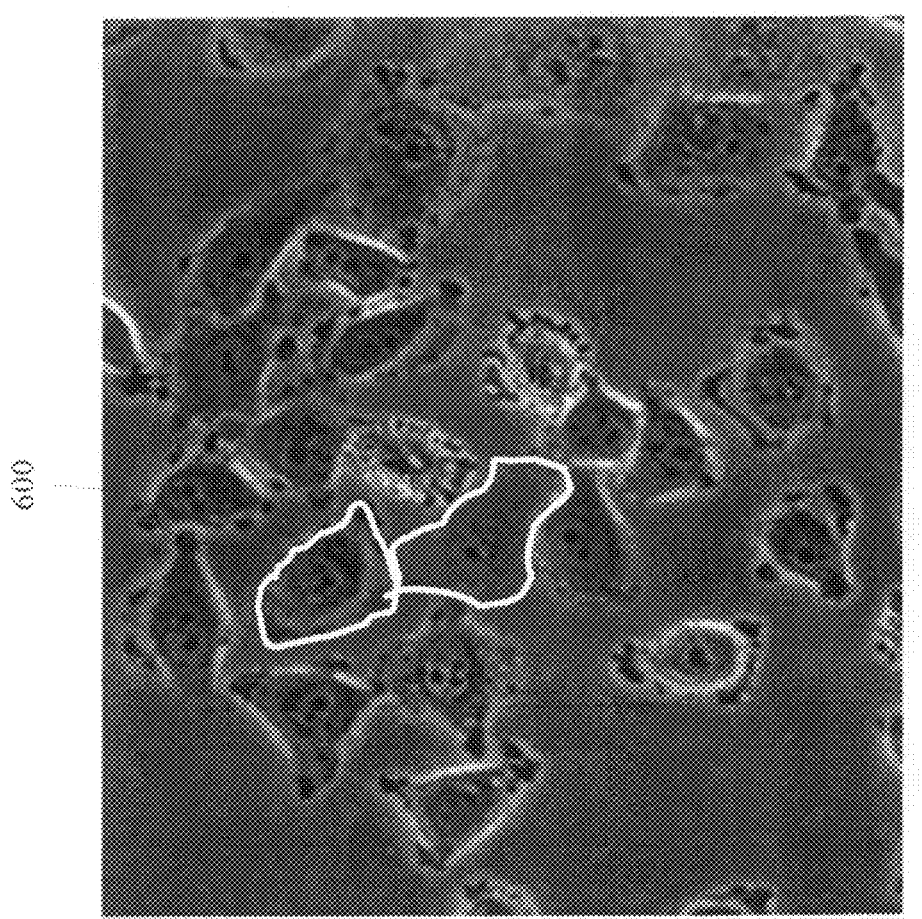
FIG. 6 shows an example user drawn boundaries highlighted in white.

The object boundary 200 can be simply created by user drawing while simultaneously viewing the teaching image 202 from a computer display as shown in FIG. 6. Not all boundaries need to be drawn; the user drawn boundaries 600 could be from a few selected objects. But the boundary for each selected object needed to be completely enclosed.

II.2 Object Contour Reference Map Creation

Figure 7:
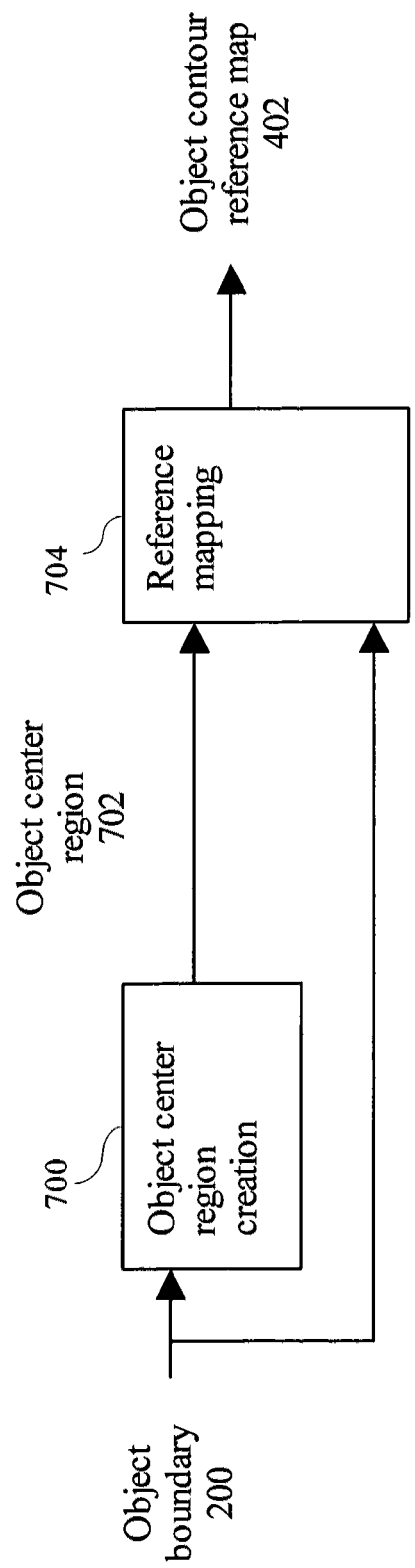
FIG. 7 shows the processing flow for the object contour reference map creation method.

The reference object contour map is an ideal representation of object having smooth and stable intensity distribution with the lowest values at boundary and highest values around the center of the objects. This is generated by the object contour reference map creation step 400. To assure good separation of overlapping objects, the object contour reference map 402 is self calibrated. That is, each object has similar low and high values regardless of its size. As shown in FIG. 7, the object contour reference map creation step 400 inputs an object boundary 200 and first performs object center region creation 700 and then performs reference mapping 704 using the object boundary 200 and the object center region 702.

A. Object Center Region Creation

In one embodiment of the invention, the object center region creation 700 is performed by an inner distance transformation of the object from the object boundary 200. The inner distance transformation encodes the distance value of each point inside the object to its closest object boundary 200. Those ordinary skilled in the art, should recognize that different distance metric could be applied such as Norm 0, Norm 1, Norm 2, Norm infinity, Eucledian distance etc. The distance transformation is a well-known image processing operation that can be implemented by a two-pass dynamic programming like method (See Lee J S J, et. al., Method for adaptive image region partition and morphologic processing, U.S. Pat. No. 7,813,580, Oct. 12, 2010). The location having the maximum distance value is the candidate object center region 702. If multiple maximum locations exist, a center selection rule is defined. In one embodiment of the invention, the maximum location that is closest to the centroid of the object is chosen as the center. If multiple maximum points having equal distance to the centroid, the object center region can be arbitrarily selected among them.

B. Reference Mapping

In one embodiment of the invention, the outer distance map of the object center region 702, Dist_outer_center, is combined with the inner distance map within the object boundary 200 Dist_inner_object to create object contour reference map 402, Map_reference, as follows:

$$Map\_reference[x//y] = height*Dist\_inner\_object[x//y]/(Dist\_inner\_object[x//y] + Dist\_outer\_center[x/y])$$

Where x" and 'y" are position indices of the map and "height" is the reference height that is common to each object. This allows the proper separation of objects even when they overlap and have different sizes.

Figure 8B:
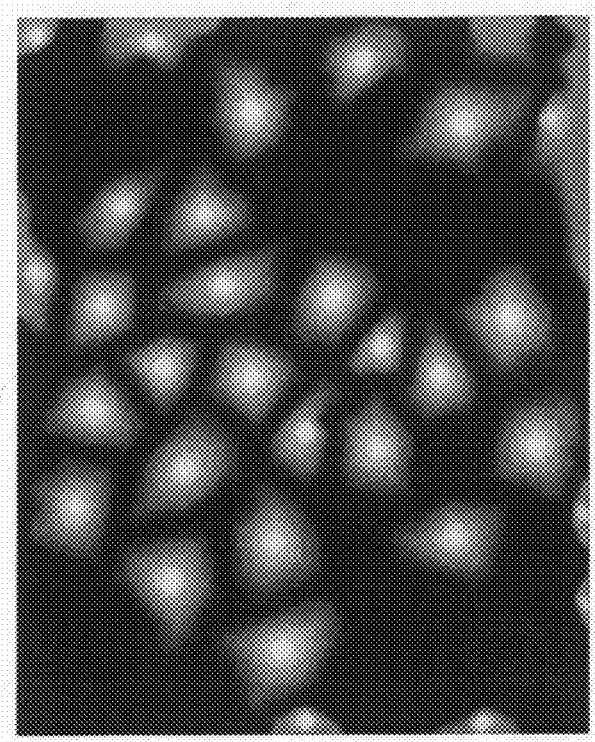
FIG. 8B shows the object contour reference map for the object mask of FIG. 8A.
Figure 8A:
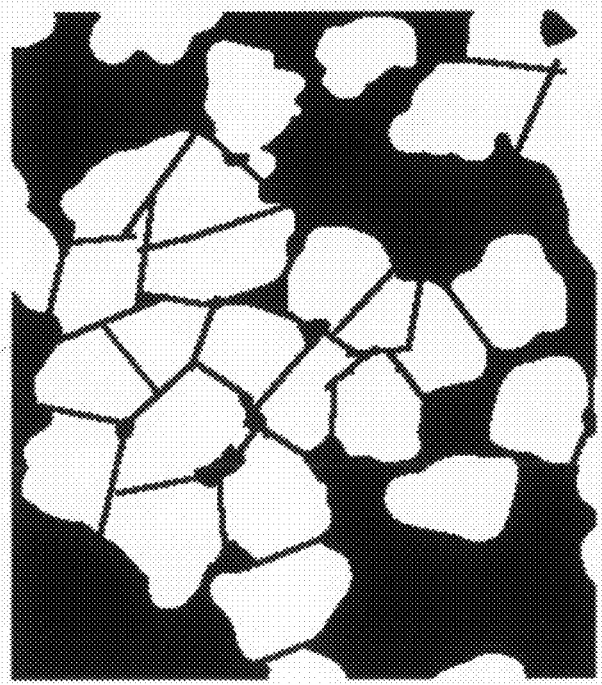
FIG. 8A shows an example object mask with object boundary separated.

FIG. 8A shows an example object mask 504 with object boundary separated and FIG. 8B shows its object contour reference map 800.

II.3 Soft Fitting

Figure 9:
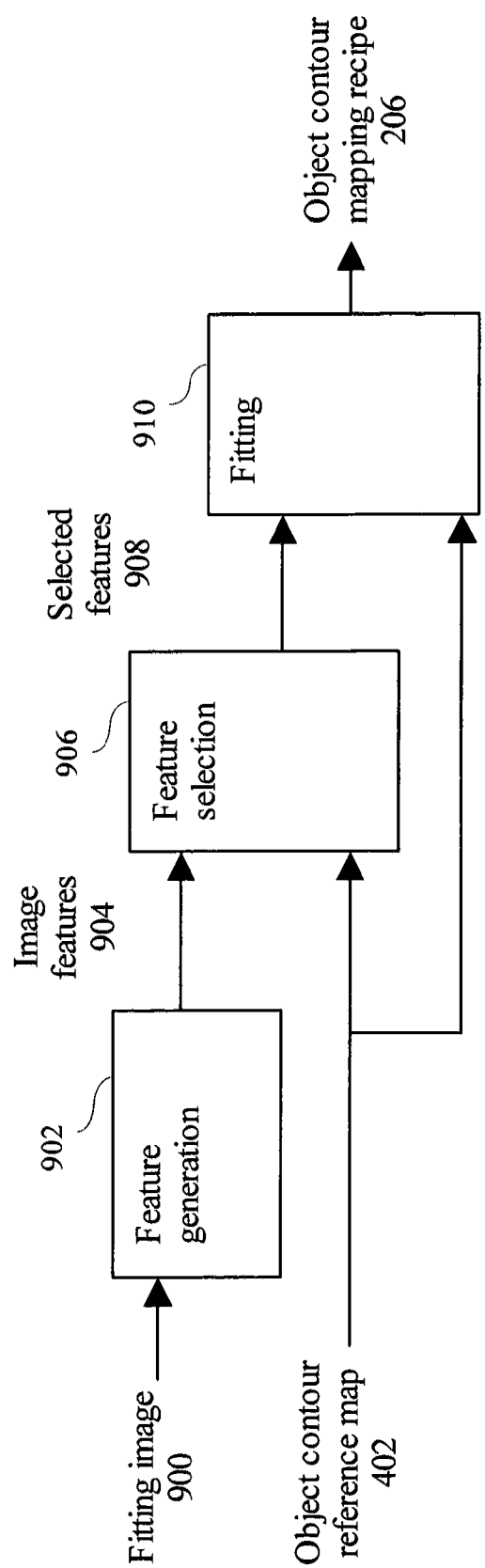
FIG. 9 shows the processing flow for the soft fitting method consists of a feature generation, a feature selection and a fitting step.

Soft fitting finds the optimal relationship between the object contour reference map 402 and teaching image 202 for the teaching region of the teaching image corresponding to the object boundary input. It consists of a feature generation 902, a feature selection 906 and a fitting step 910 as shown in FIG. 9. The feature generation step 902 inputs fitting image 900 and object contour reference map 402 to generate a set of comprehensive image features 904 for the feature selection step 906. The fitting image 900 will be the teaching image 202 if a single resolution processing is performed. It will be the residual image if it is operated in a multi-resolution fashion. The feature selection step 906 inputs the fitting image 900 and the object contour reference map 402 and selects the optimal combination of features (selected features 908) for fitting. The fitting step 910 fits the selected features 908 with object contour reference map 402 to create the object contour mapping recipe 206.

II.3.1 Feature Generation

Characterization features associated with each image pixel is extracted. The extracted feature vectors will be used for fitting. In one embodiment of the invention, the features are derived from the grayscale intensity of the fitting image. In addition to the original grayscale intensity, a pixel neighborhood (such as 3×3, 5×5, 7×7 etc.) is defined. The grayscale intensity statistics such as mean, standard deviation, skewness, kurtosis and other statistics such as cooccurrence matrix based texture measurements, facet model parameters and facet model parameter derived features can be derived. Moreover, pre-processing of the grayscale intensity can be performed before gathering the statistics. The pre-processing includes point operations such as logarithm conversion for optical density measurement or filtering such as edge enhancement by linear or morphological gradient operator that includes dark edge, bright edge, and general edge enhancement.

When the input image is a color image, color transformation may be applied to convert the color image into multi-bands of grayscale images. In one embodiment of the invention, the multiple bands includes the following images: R (Red channel), G (Green channel), B (Blue channel), (R−G)/(R+G), R/(R+G+B), G/(R+G+B), B/(R+G+B), R/G, R/B, G/B, G/R, B/G, B/R, etc.

The intensity space features with and without pre-processing can be generated for each band of the image. The characterization features could be performed in multi-resolution representation of the input image to characterize the patterns in different scales. Those ordinary skilled in the art should recognize that other feature spaces such as temporal space or different focal planes could be used and they are all within the scope of this invention.

II.3.2 Feature Selection

The fitting performance could degrade in the presence of irrelevant or redundant information. The aim of the feature selection step 906 is to find a subset of features for fitting that could result in better performance than using all features.

In one embodiment of the invention, the feature selection is performed sequentially by the following steps:
1. Set an initial feature count K;
2. Select each unique K feature combination,
3. Perform fitting of all K feature combinations to the object contour reference map and get the fitting errors;
4. Select the feature combination having the lowest error as the current feature set;
5. If the number of features in the current feature set is equal to or greater than the desired feature count C, exit the process. Otherwise, go to step 6;
6. Add each feature not in the current feature set sequentially to generate new feature combinations,
7. Repeat steps 3-5.

Step 1 set an initial feature count K. K should be a small number as large K will have too many unique K feature combinations.

Step 3 performs fitting of all feature combinations to the object contour reference map and gets the fitting errors. In one embodiment of the invention, the linear regression method is used. The linear regression method fits the linear model of input feature combination for each point in the map, F, to output object contour reference map m.

Suppose we have n points in the map and we have p features per point from the input feature combination, then the linear model is:

$$m = [\vec{1}, f_1, f_2, \ldots, f_p] \begin{bmatrix} \alpha_0 \\ \alpha_1 \\ \ldots \\ \alpha_p \end{bmatrix}$$

where m, $f_1, f_2, \ldots, f_p$ are all n×1 vectors representing the output object contour reference map and each feature of the input feature map, and $\alpha_0, \alpha_1, \ldots, \alpha_p$ are coefficients to estimate by regression. For simplicity, we re-write it in matrix form $$m = F\alpha$$

where F is a n×(p+1) matrix.

The linear regression can be formulated as the following Least-Square problem:

$$\arg\min \|m - F\alpha\|_2^2$$

It is well know that the solution $\bar{\alpha}$ is:

$$\bar{\alpha} = (F^T F)^{-1} F^T m$$

Therefore, the fitting error E is $$E = \|m - F\bar{\alpha}\|_2^2$$

The above fitting method treats all points in the object contour reference map equally. In another embodiment of the invention, user can input different weights for different points in the map. In this case, we have another n×1 weight vector w representing the different weights for each pixel. Then the linear regression can be formulated as the following Least-Square problem:

$$\arg\min \|R(m - F\alpha)\|_2^2$$

The solution $\bar{\bar{\alpha}}$ is:

$$\bar{\bar{\alpha}} = (\bar{F}^T \bar{F})^{-1} \bar{F}^T \bar{m}$$

where $$\bar{F} = RF, \bar{m} = Rm$$

and R is a diagonal n×n matrix, with diagonal elements $R_{ii} = \sqrt{w_i}$.

The fitting error E is $$\bar{E} = \|\bar{m} - \bar{F}\bar{\bar{\alpha}}\|_2^2$$

Those ordinary skilled in the art should recognize that other methods of feature selection can be used such as the filter approach and the wrapper approach.

II.3.3 Fitting

The fitting step takes the selected features from the feature selection step to fit with the object contour reference map. The fitting coefficients along with the selected feature indices are stored in the object contour mapping recipe for the application phase. For update teaching, some intermediate fitting data may also be stored in the recipe. In the application phase, selected features are calculated and combined into a contour map using the fitting coefficients stored in the recipe and cell partitioning is performed based on the contour map.

In one embodiment of the invention, the linear regression method as described above is used for fitting. In another embodiment of the invention, nonlinear models such as exponential functions, logarithmic functions, trigonometric functions, power functions, Gaussian function, and Lorentzian curve can be used and nonlinear regression method using iterative optimization scheme or nonlinear least square methods can be used for the fitting step. Those skilled in the art should recognize that the nonlinear least square methods include Gauss-Newton method, gradient methods and direct search methods, etc.

II.3.4 Multi-Resolution Soft Fitting

In another embodiment of the invention, a multi-resolution soft fitting method is used. The multi-resolution soft fitting method has advantage of encoding the spatial correlations and contexts through the spatial integration into low resolution. In the multi-resolution soft fitting method, the fitting image I is down-sampled progressively up to level K. This yields the following images: $I_0, I_1, \ldots, I_K$. Where $I_0 = I$ and $I_q$ is a down-sample version of $I_{q-1}$. In one embodiment of the invention a low pass filtering proceeds the down-sampling operation and the down-sampling is by a factor of 2 at each level. Similarly, the object contour reference map m is down-sampled to level K: $m_0, m_1, \ldots, m_K$.

The soft fitting is performed from the lowest resolution level K first and progressively toward the higher resolution level. In the lowest resolution level, $I_K$ and $m_K$ are used as fitting image 900 and object contour reference map 402 for soft fitting using the operation as described in FIG. 9. It performs feature generation for level K and fitting to output the object contour mapping recipe at level K.

At a subsequent level q from K−1 to 0, the image $I_q$ is used as the fitting image yet the object contour reference map $m_q$ is not directly used. Instead a residual between $m_q$ and the q+1-th level fitting result is used. In this way, the q-th level fitting can make up for the imperfect fitting from the q+1-th level. That is, we use $$m_q - (F_{q+1}\bar{\alpha}_{q+1})\uparrow$$

where $F_{q+}$ is the selected feature matrix at level q+1, $\bar{\alpha}_{q+1}$ is the fitting coefficients at level q+1, and ↑ is the up-sampling function that up-samples the image at level q+1 to the same size as level q. In one embodiment of the invention, the up-sampling includes pixel replication followed by a low-pass filtering.

III. Object Contour Mapping

As shown in FIG. 2, the object contour mapping recipe 206 contains the instructions for a computer to perform object contour mapping 210 to an application image 208 during the application phase. This creates an object contour map 212. The object contour mapping step 212 computes the selected feature 908 for the application image, and uses the feature values F and fitting coefficients $\bar{\alpha}$ to calculate the desired output $F\bar{\alpha}$. If the object contour mapping recipe 206 contains multi-resolution soft fitting coefficients, the computation is performed in a multi-resolution fashion from lowest resolution level to the highest resolution level as follows:

$$\bar{m}_K = F_K \bar{\alpha}_K$$

$$\bar{m}_q = F_q \bar{\alpha}_q + \bar{m}_{q+1}\uparrow \text{ for } q = K-1, \ldots, 1$$

$$\bar{m}_0 = F_0 \bar{\alpha}_0 + \bar{m}_1 \uparrow$$

The process starts from the lowest level where $\bar{m}_K$ is computed and up-sampled by one level; then one level higher $F_{K-1}\bar{\alpha}_{K-1}$ is computed and up-sampled level K result $\bar{m}_K\uparrow$ is added to create $\bar{m}_{K-1}$, and then the sum is u-sampled to be added again. This process is repeated until level 0 where the final result $\bar{m}_0$ is created by $$\bar{m}_0 = F_0 \bar{\alpha}_0 + \bar{m}_1 \uparrow$$

Note that the above fitting coefficients can be replaced by $\bar{\bar{\alpha}}$ when the weighting factor is assigned for each pixels during teaching phase.

II.3.5 Object Region Partition

The object contour map has smooth and stable intensity distribution with generally the lowest values at boundary and highest values around the center of the objects. The object contour map can be processed by an object region partition step to generate at least one object region partition output.

Figure 10:
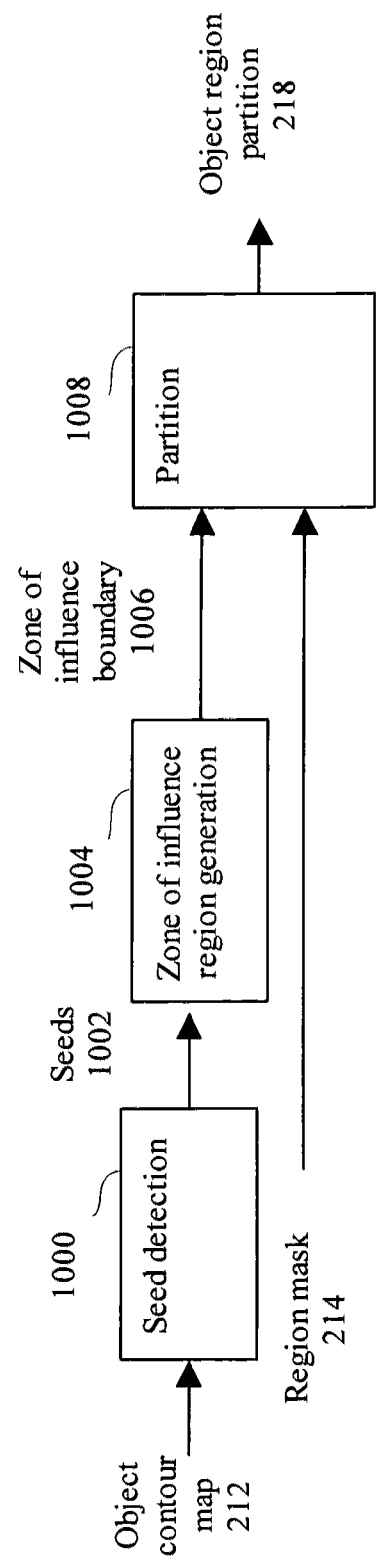
FIG. 10 shows the processing flow for the object region partition method.

In one embodiment of the invention, the object region partition is performed by a guided partition method as shown in FIG. 10. A seed detection step 1000 is performed on the object contour map 212 to generate seeds 1002. The seeds 1002 can be detected by finding the maximum regions of the object contour map 212. In one embodiment of the invention, the maximum region can be detected by finding the map points whose intensity values are equal to the intensity dilated map. This could be followed by false maximum (such as flat region or fragmented regions) rejection. The seeds 1002 can be used by the zone of influence region generation step 1004 (See U.S. Pat. No. 7,580,556 Image region partitioning using pre-labeled regions). The boundary between the zones can be detected by edge detection to generate zone of influence boundary 1006. The zone of influence boundary 1006 can be used to cut the region mask 214 for partition. The cutting operation separates region mask using the zone of influence boundary 1006.

In another embodiment of the invention, a multiple guided partition method can be applied by an iterative procedure based on the guided partition method at each iteration. The multiple guided partition method consists of the following steps:

1. Set the iteration number to 0 and set the maximum iteration limit;
2. Set the maximum size of the object region;
3. Set an threshold value;
4. Set the input region mask as the partition candidate region;
5. Set the object contour map as the valid contour map;
6. Generate seeds by obtaining the regions of the valid contour map having higher values than the threshold value;
7. Perform guided partition on the partition candidate region using the seeds detected from step 6;
8. Update partition candidate region by removing the partitioned regions smaller than the maximum size;
9. Update valid contour map by retaining only the map within the partition candidate region;
10. Increase threshold value;
11. Increment iteration number by 1;
12. If the iteration number is greater than the maximum iteration limit, complete and exit;
13. Else repeat steps 6 to 12.

Those skilled in the art should recognize other region partition method such as watershed transformation method and graph partitioning method can be applied to the object contour map and achieved improved partition results due to the smooth and stable intensity distribution of the object contour map.

3. Update Teaching

The teaching image may not be representative of an application. Therefore, updated teaching is important for creating an updated contour mapping recipe 312 that has stable performance across a broad range of application images. This can be accomplished by the alternative application scenario of the current invention as shown in FIG. 3. In this scenario, validation image 300 is applied to the object contour mapping recipe 206 that is created initially using the teaching image 202. It is preferred that the validation image 300 is a significantly different image from the teaching image even though both of them are from the same application. Alternatively, the validation image 300 could be the same as the teaching image 202 but there are un-taught regions that are significantly different from the taught regions. The object contour mapping 210 of the validation image 300 generates a validation contour map 302. The validation contour map 302 along with the input region mask 214 can be processed through the object region partition step 216 to generate validation object region partition 304.

The validation object region partition 304 can be reviewed by human to perform boundary correction 306. The boundary correction step 306 corrects the incorrectly partitioned region by a user using computer graphical user interface. This generates a corrected object boundary 308 for update contour mapping step 310.

In one embodiment of the invention, the update contour mapping is performed by weighted linear combination. In this case, the update teaching does not require the training image for the creation of the initial contour mapping recipe. It only needs the fitting coefficients $\bar{\alpha}$ for the update. Let the original teaching image region contains n points with an average weight of $\bar{w}'$. Let the validation image teaching region contains l points with an average weight of $\bar{w}$ and an object contour mapping recipe creation step applies to only the corrected object boundary and validation image create a fitting coefficients $\bar{\alpha}'$. Then the fitting coefficients $\bar{\alpha}_u$ for the updated contour mapping recipe is:

$$\bar{\alpha}_u = \frac{n\bar{w}\bar{\alpha} + l\bar{w}'\bar{\alpha}'}{n\bar{w} + l\bar{w}'}$$

When multi-resolution soft fitting is used, the fitting coefficients are updated at each of the multi-resolution level. The updated can be performed with or without weighting factors.

$F^T F$ and $F^T m$

In another embodiment of the invention, the update contour mapping updates $F^T F$ and $F^T m$ In this case, the vectors are saved in the object contour mapping recipe so they could be easily updated. When the object contour mapping recipe creation step applies to only the corrected object boundary and validation image, it creates $(F^T F)'$ and $(F^T m)'$. This is combined with $F^T F$ and $F^T m$ for update by the following rule:

$$(F^T F)_u = \frac{n\bar{w}F^T F + l\bar{w}'(F^T F)'}{n\bar{w} + l\bar{w}'}$$

$$(F^T m)_u = \frac{n\bar{w}F^T m + l\bar{w}'(F^T m)'}{n\bar{w} + l\bar{w}'}$$

Then the fitting coefficients $\bar{\alpha}_u$ for the updated contour mapping recipe is:

$$\bar{\alpha}_u = (F^T F)_u^{-1}(F^T m)_u$$

When multi-resolution soft fitting is used, the fitting coefficients are updated at each resolution level. The updated can be performed with or without weighting factors.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A teachable object contour mapping method for biological object aggregation comprising the steps of:
    a) Input an object boundary and a teaching image containing object aggregate;
    b) Perform object contour reference map creation using the object boundary having object contour reference map output wherein the object contour reference map has lowest values at boundary and highest values around center; Perform object center region creation using the object boundary having object center region output; Perform reference mapping using the object center region and the object boundary having the object contour reference map output wherein the object contour reference map is created by combining outer distance map, inner distance map, and height in a ratio format;
    c) Perform object contour mapping recipe creation using the object contour reference map and the teaching image having object contour mapping recipe output wherein the object contour mapping recipe stores fitting coefficients for fitting pixels in the teaching image to pixels in the contour reference map;
    d) Input an application image;
    e) Perform object contour mapping using the object contour mapping recipe and the application image having object contour map output, wherein the object contour mapping applies the fitting coefficients in the object contour mapping recipe to pixels in the application image.

2. The teachable object contour mapping method of claim 1 further comprises an object region partition step using the object contour map having object region partition output wherein the object region partition is performed by a guided partition method.

3. The teachable object contour mapping method of claim 1 wherein the object contour mapping recipe creation step further
    performs soft fitting using the object contour reference map and the teaching image having object contour mapping recipe output.

4. The soft fitting step of claim 3 comprises the steps of:
    a) Perform feature generation using the teaching image having image features output;
    b) Perform feature selection using the image features and the object contour reference map having selected features output;
    c) Perform fitting using the selected features and the object contour reference map having object contour mapping recipe output.

5. The object contour mapping recipe creation step of claim 3 uses multi-resolution soft fitting.

6. The object contour mapping recipe creation step of claim 3 inputs different weights for different points of mapping.

7. The reference mapping step of claim 1 combines outer distance map of the object center region and inner distance map within the object boundary by the following rule $$\text{Map\_reference}[x][y] = \text{height} * \text{Dist\_inner\_object}[x][y] / (\text{Dist\_inner\_object}[x][y] + \text{Dist\_outer\_center}[x][y]).$$

8. The teachable object contour mapping method of claim 1 wherein the object contour mapping is performed in multi-resolution fashion from lowest resolution level to highest resolution level.

* * * * *